(12) United States Patent
Hoyt

(10) Patent No.: US 11,974,893 B2
(45) Date of Patent: May 7, 2024

(54) ELECTRIC TOOTHBRUSH CHARGING STATION PLATFORM ORGANIZER

(71) Applicant: Matthew Hoyt, Fairport, NY (US)

(72) Inventor: Matthew Hoyt, Fairport, NY (US)

(*) Notice: Subject to any disclaimer, the term of this patent is extended or adjusted under 35 U.S.C. 154(b) by 324 days.

(21) Appl. No.: 17/516,780

(22) Filed: Nov. 2, 2021

(65) Prior Publication Data

US 2023/0136556 A1 May 4, 2023

(51) Int. Cl.
*H01M 10/46* (2006.01)
*A61C 17/22* (2006.01)
*H02J 7/00* (2006.01)

(52) U.S. Cl.
CPC .......... *A61C 17/224* (2013.01); *H02J 7/0044* (2013.01); *H02J 2207/30* (2020.01)

(58) Field of Classification Search
CPC .... H02J 7/0042; H02J 7/0044; H02J 2207/30; A61C 17/224
USPC ......... 320/107, 114, 115, 116; 132/308, 310, 132/311
See application file for complete search history.

(56) References Cited

U.S. PATENT DOCUMENTS

| | | | | |
|---|---|---|---|---|
| 2006/0264094 A1* | 11/2006 | Young | .................. | H01R 25/006 439/501 |
| 2012/0098493 A1* | 4/2012 | Budike | .................. | H02J 7/0044 320/111 |
| 2015/0162760 A1* | 6/2015 | Clark | .................... | H02J 7/0042 320/103 |
| 2019/0027944 A1* | 1/2019 | Grzybowski | ......... | H02J 7/0044 |

* cited by examiner

*Primary Examiner* — Edward Tso
(74) *Attorney, Agent, or Firm* — Michael J. Nickerson; Dawson Law Firm, PC

(57) ABSTRACT

An electric toothbrush charging station platform organizer for an electric powered toothbrush system having an electric powered toothbrush and a charging station, includes a housing. The housing includes an upper portion and a lower portion. The upper portion of the housing includes a recess configured to securely retain the charging station, a power cord chamber to secure a power cord of a charging station of an electric powered toothbrush, a recess passage connecting a volume of the recess with a volume of the power cord chamber, and a power cord chamber passage. The lower portion includes a power strip chamber for locating a power strip. The power cord chamber passage connects a volume of the power strip chamber with the volume of the power cord chamber.

25 Claims, 12 Drawing Sheets

ELECTRIC TOOTHBRUSH CHARGING STATION PLATFORM ORGANIZER

BACKGROUND

Conventional electric toothbrushes consist of an electric powered toothbrush and a charging station. The conventional charging station includes a platform for interfacing with the electric powered toothbrush and some type of power cord for providing electrical power to the conventional charging station.

One drawback of conventional electric toothbrushes is the use of multiple conventional electric toothbrushes in a single bathroom because each of the multiple conventional electric toothbrushes has a charging station, which can create clutter on a vanity.

To solve this issue, a conventional electric toothbrush charging station platform organizer was developed, as illustrated in FIGS. 1-4.

FIG. 1 shows a front view of a conventional electric toothbrush charging station platform organizer. As illustrated in FIG. 1, a conventional electric toothbrush charging station platform organizer 200 includes a platform 210 for securely holding two charging stations. The conventional electric toothbrush charging station platform organizer 200 also includes an electrical outlet plate 230 integral to the platform 210. Additionally, the conventional electric toothbrush charging station platform organizer 200 includes supports 220 to support the platform 210. The supports 220 are integral to the platform 210 and the electrical outlet plate 230.

The electrical outlet plate 230 includes opening 235 to provide access to the power receptacles of the electrical outlet and openings 240 to provide access to threaded holes in an electrical box (not shown) so that the conventional electric toothbrush charging station platform organizer 200 can be mounted to an electrical outlet, via screws (not shown).

FIG. 2 shows a back view of the conventional electric toothbrush charging station platform organizer. As illustrated in FIG. 2, the conventional electric toothbrush charging station platform organizer 200 includes a platform 210 for securely holding two charging stations. The platform 210 includes chambers 250 and 260 for holding a portion of the power cords associated with a charging station (not shown).

The conventional electric toothbrush charging station platform organizer 200 also includes an electrical outlet plate 230 integral to the platform 210. Additionally, the conventional electric toothbrush charging station platform organizer 200 includes supports 220 to support the platform 210. The supports 220 are integral to the platform 210 and the electrical outlet plate 230.

The electrical outlet plate 230 includes opening 235 to provide access to the power receptacles of the electrical outlet and openings 240 to provide access to threaded holes in an electrical box (not shown) so that the conventional electric toothbrush charging station platform organizer 200 can be mounted to an electrical outlet, via screws (not shown).

FIG. 3 shows a cutaway view of the conventional electric toothbrush charging station platform organizer. As illustrated in FIG. 3, the conventional electric toothbrush charging station platform organizer 200 includes a platform 210 for securely holding two charging stations. One of the two charging stations is secured in recess 270 which is configured to match the shape of the charging station. The platform 210 also includes chambers 250 and 260 for holding a portion of the power cords associated with a charging station (not shown). The power cord (not shown), associated with a charging station, passes from recess 270, through passage 275, into chamber 250, and through passage 255. After passing through passage 255, the power cord can engage the electrical outlet.

The conventional electric toothbrush charging station platform organizer 200 also includes an electrical outlet plate 230 integral to the platform 210. Additionally, the conventional electric toothbrush charging station platform organizer 200 includes supports 220 to support the platform 210. The supports 220 are integral to the platform 210 and the electrical outlet plate 230.

FIG. 4 shows a top view of the conventional electric toothbrush charging station platform organizer. As illustrated in FIG. 4, the conventional electric toothbrush charging station platform organizer 200 includes a platform 210 for securely holding two charging stations. One of the two charging stations is secured in recess 270 which is configured to match the shape of the charging station. The platform 210 includes recesses 270 and 280, which are configured to match the shape of the charging stations. Recess 270 includes passage 275, and recess 280 includes passage 285.

As described above, each charging station requires a connection to a power source. Most bathrooms have only a single power outlet having two receptacles (two power sources). Thus, the use of three or more charging stations can become problematic in trying to coordinate the power needs of each charging station.

It is noted that the charging station, in addition to providing power to charge the electric powered toothbrush, provides a holding or storage function to keep the electric powered toothbrush in an upright position. Notwithstanding this function, due to the design of the conventional charging station and the design of the electric powered toothbrush, the combination of the two creates a top heavy item that can be easily topple, thereby cluttering a vanity's top surface.

Furthermore, the power cords can become an issue if not properly secured.

Lastly, the conventional electric toothbrush charging station platform organizer must be connected to an electrical box, thereby exposing a user to potential injury from an electrical shock when installing the conventional electric toothbrush charging station platform organizer.

As demonstrated above, the conventional electric toothbrush charging station platform organizer does not address the issue of a limited number of electrical receptacles.

Moreover, the conventional electric toothbrush charging station platform organizer does not address the issue of the clutter from the power cords when three or more charging stations are being utilized.

Lastly, the conventional electric toothbrush charging station platform organizer may expose a user to potential injury from an electrical shock when installing the conventional electric toothbrush charging station platform organizer.

Therefore, it is desirable to provide an electric toothbrush charging station platform organizer which does not require access to multiple electrical receptacles.

It is also desirable to provide an electric toothbrush charging station platform organizer which reduces clutter from the multiple power cords.

Furthermore, it is desirable to provide an electric toothbrush charging station platform organizer avoids exposing a user to potential injury from an electrical shock when installing the electric toothbrush charging station platform organizer.

Moreover, it is desirable to provide an electric toothbrush charging station platform organizer which does not require access to multiple electrical receptacles and reduces clutter from the multiple power cords.

Additionally, it is desirable to provide an electric toothbrush charging station platform organizer which does not require access to multiple electrical receptacles and avoids exposing a user to potential injury from an electrical shock when installing the conventional electric toothbrush charging station platform organizer.

Also, it is desirable to provide an electric toothbrush charging station platform organizer avoids exposing a user to potential injury from an electrical shock when installing the electric toothbrush charging station platform organizer and reduces clutter from the multiple power cords.

Lastly, it is desirable to provide an electric toothbrush charging station platform organizer which does not require access to multiple electrical receptacles, reduces clutter from the multiple power cords, and avoids exposing a user to potential injury from an electrical shock when installing the conventional electric toothbrush charging station platform organizer.

BRIEF DESCRIPTION OF THE DRAWINGS

The drawings are only for purposes of illustrating various embodiments and are not to be construed as limiting, wherein.

DETAILED DESCRIPTION

Figure 1:
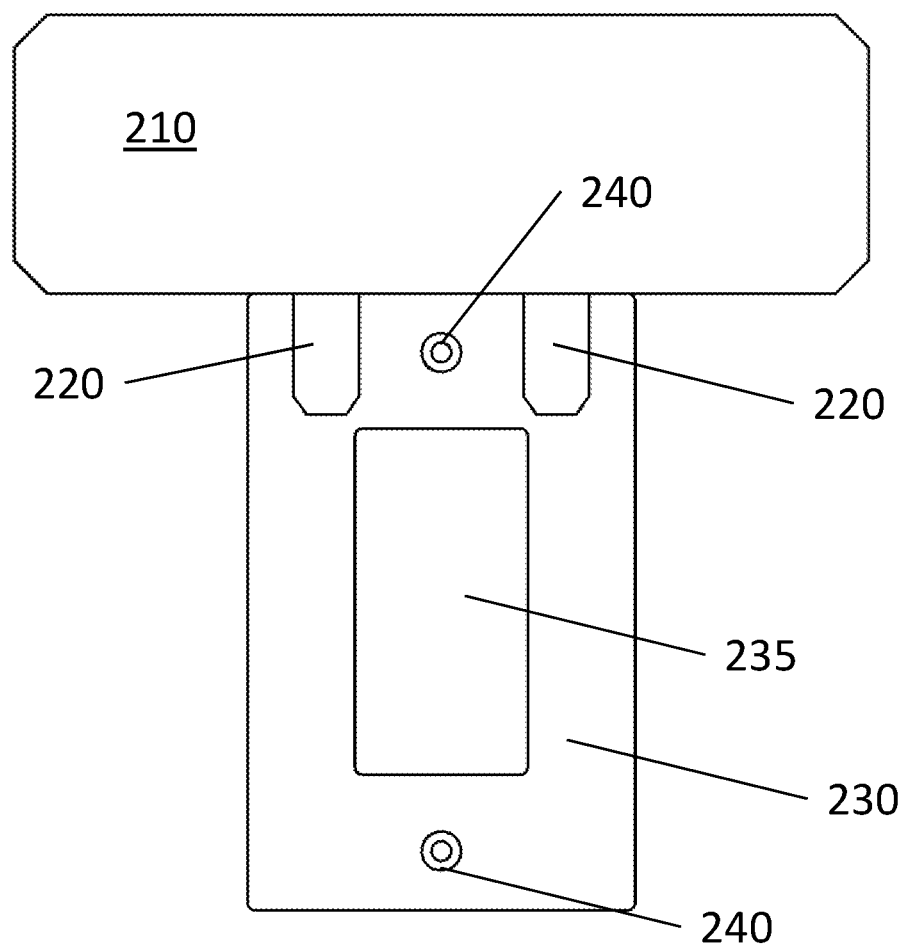
FIGS. 1-4 show different views of a conventional electric toothbrush charging station platform organizer.
Figure 2:
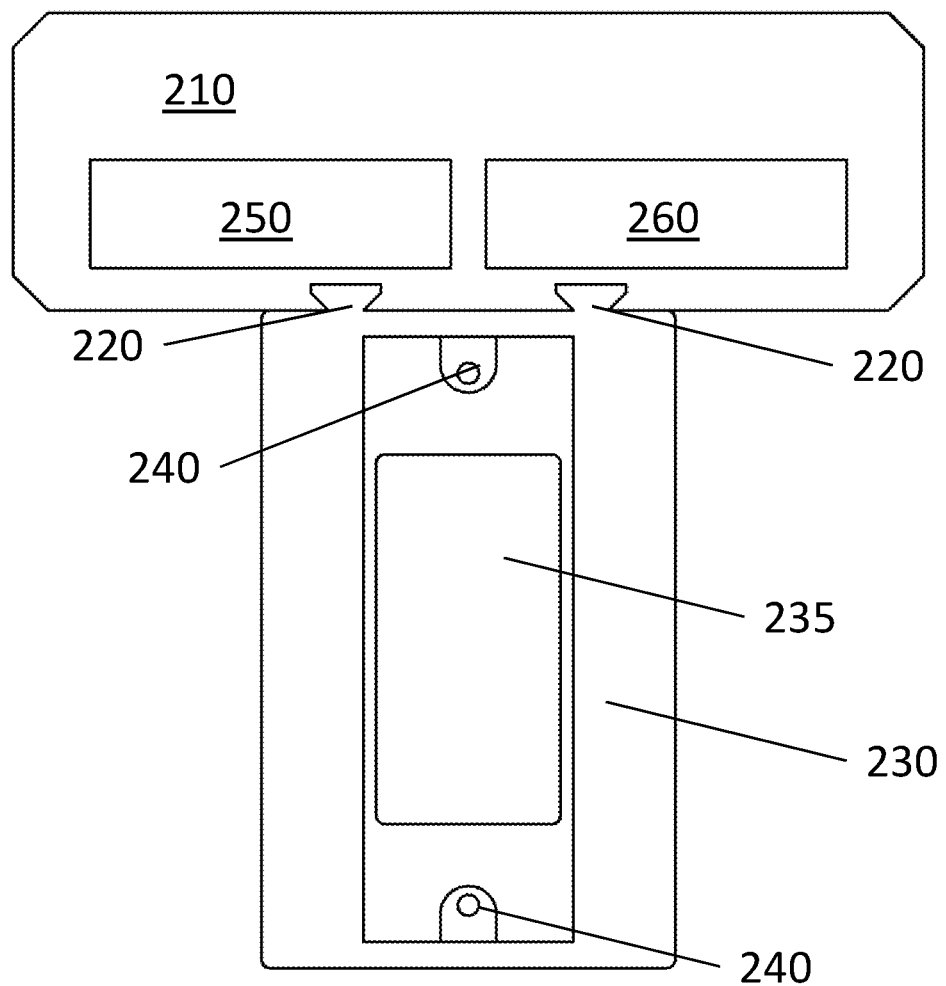
Figure 3:
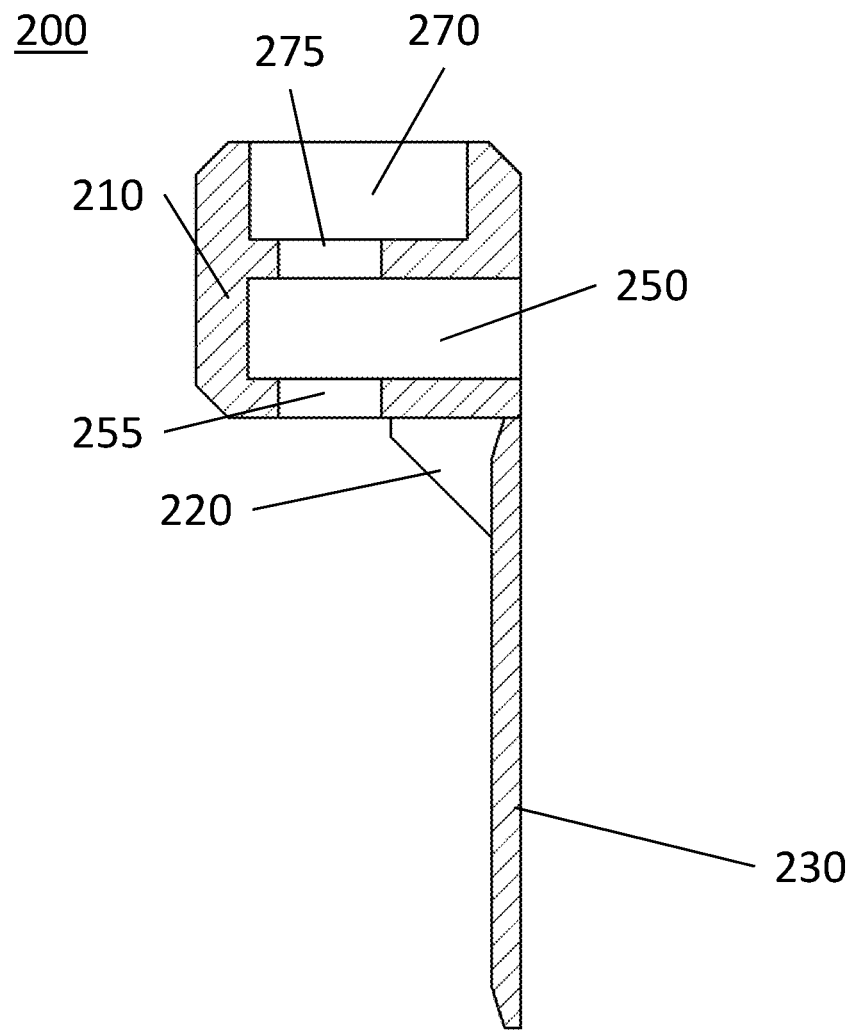
Figure 4:
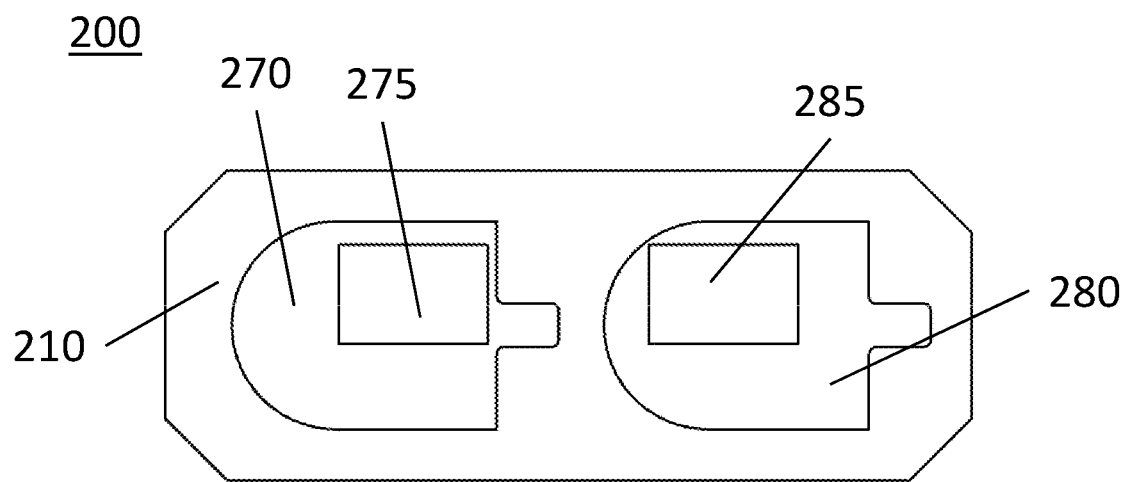

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

Figure 5:
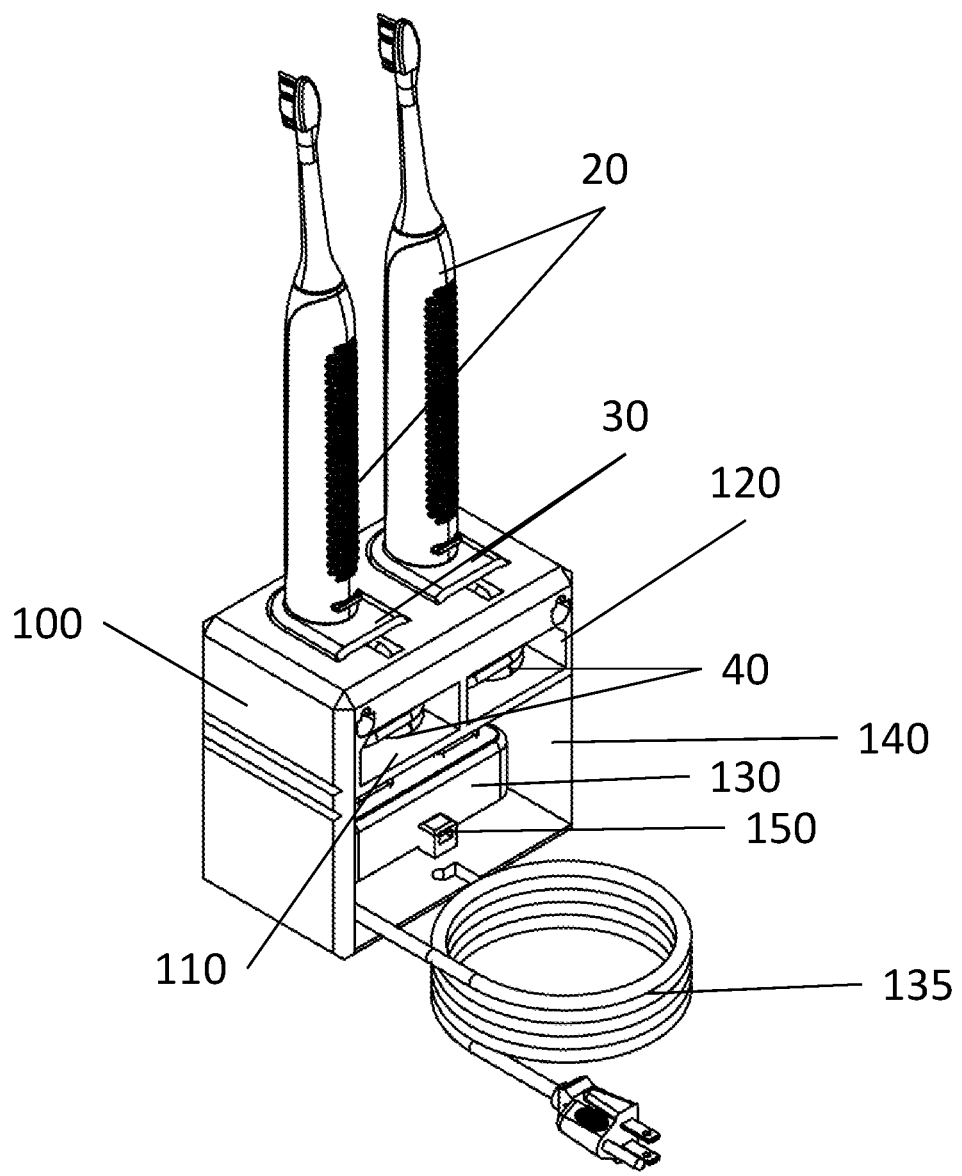
FIG. 5 shows a perspective view of an electric toothbrush charging station platform organizer.

FIG. 5 shows a perspective view of an electric toothbrush charging station platform organizer. As illustrated in FIG. 5, an electric toothbrush charging station platform organizer includes a housing 100 with power cord chambers 110 and 120 to secure power cords 40 of charging stations 30 of electric powered toothbrushes 20.

The housing 100 may be constructed of plastic. The housing 100 may be an integral construction. The housing 100 may be constructed using 3-D printing or injection molding.

Moreover, the power cord chambers 110 and 120 may include vertical projections (not shown) located on a floor of the power cord chambers. The vertical projections (not shown) can be positioned to enable a power cord to be securely wrapped around at least two vertical projections.

The electric toothbrush charging station platform organizer also includes a power strip chamber 140 for holding a power strip 130. The power strip 130 is secured horizontally in the power strip chamber 140 by horizontal stop member 150.

The power strip 130 includes a power cord 135 for engaging a receptacle of an electrical outlet (not shown). The power strip 130 includes multiple electrical receptacles to receive the plugs of the power cords 40 of charging stations 30 of electric powered toothbrushes 20.

It is noted that the power strip 130 may be integral to the housing 100 of the electric toothbrush charging station platform organizer such that the power strip 130 is not a stand-alone removable element of the electric toothbrush charging station platform organizer. More specifically, the electronics and/or power receptacles of the power strip 130 may be integral to the housing 100 of the electric toothbrush charging station platform organizer. In this embodiment, the housing interface of the power cord (not shown) for the power strip 130 would also be integral to the housing 100 of the electric toothbrush charging station platform organizer.

Figure 6:
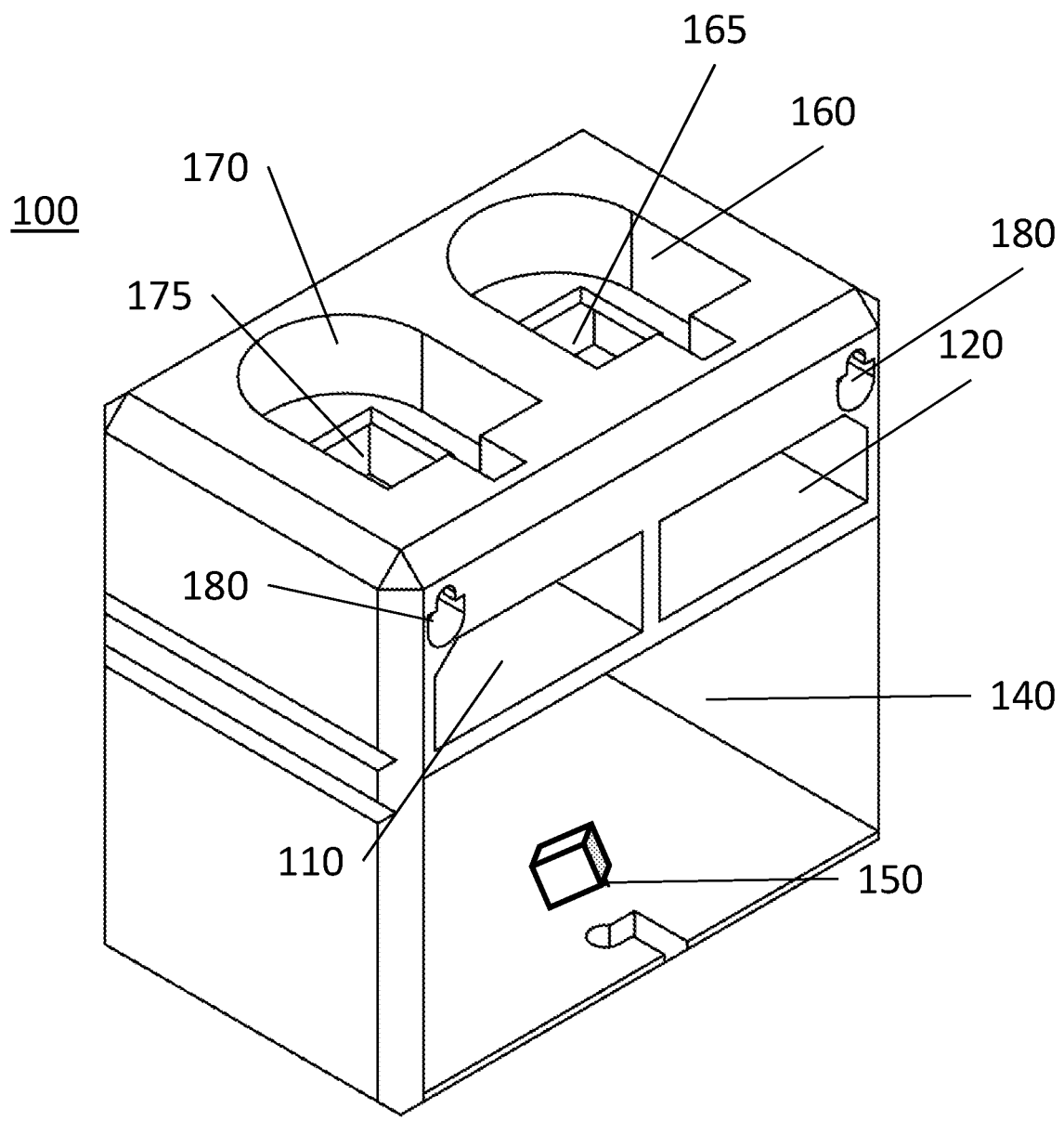
FIG. 6 shows a perspective view of the housing of the electric toothbrush charging station platform organizer of FIG. 5.

FIG. 6 shows a perspective view of the housing of the electric toothbrush charging station platform organizer of FIG. 5. As illustrated in FIG. 6, a housing 100 of the electric toothbrush charging station platform organizer includes power cord chambers 110 and 120 to secure power cords (not shown) of charging stations (not shown) of electric powered toothbrushes (not shown).

Moreover, the power cord chambers 110 and 120 may include vertical projections (not shown) located on a floor of the power cord chambers. The vertical projections (not shown) can be positioned to enable a power cord to be securely wrapped around at least two vertical projections.

The housing 100 of the electric toothbrush charging station platform organizer also includes a power strip chamber 140 for holding a power strip (not shown). The power strip (not shown) is secured horizontally in the power strip chamber 140 by horizontal stop member 150.

The housing 100 of the electric toothbrush charging station platform organizer includes openings 180 to enable the mounting of the electric toothbrush charging station platform organizer 100 to a wall so that housing 100 of the electric toothbrush charging station platform organizer is not situated on the top (horizontal surface) of a vanity. The openings 180 are configured to engage a screw head or nail head engaged with a wall.

The housing 100 of the electric toothbrush charging station platform organizer further includes recesses 170 and 160, which may be configured to match the shape of the charging stations (not shown). However, recesses 170 and 160 are configured to securely retain the charging stations (not shown). The recesses 170 and 160 may include a clip, a strap, or adhesive (such as double-sided tape), to securely retain the charging stations (not shown). Recess 170 includes recess passage 175, and recess 160 includes recess passage 165.

Figure 7:
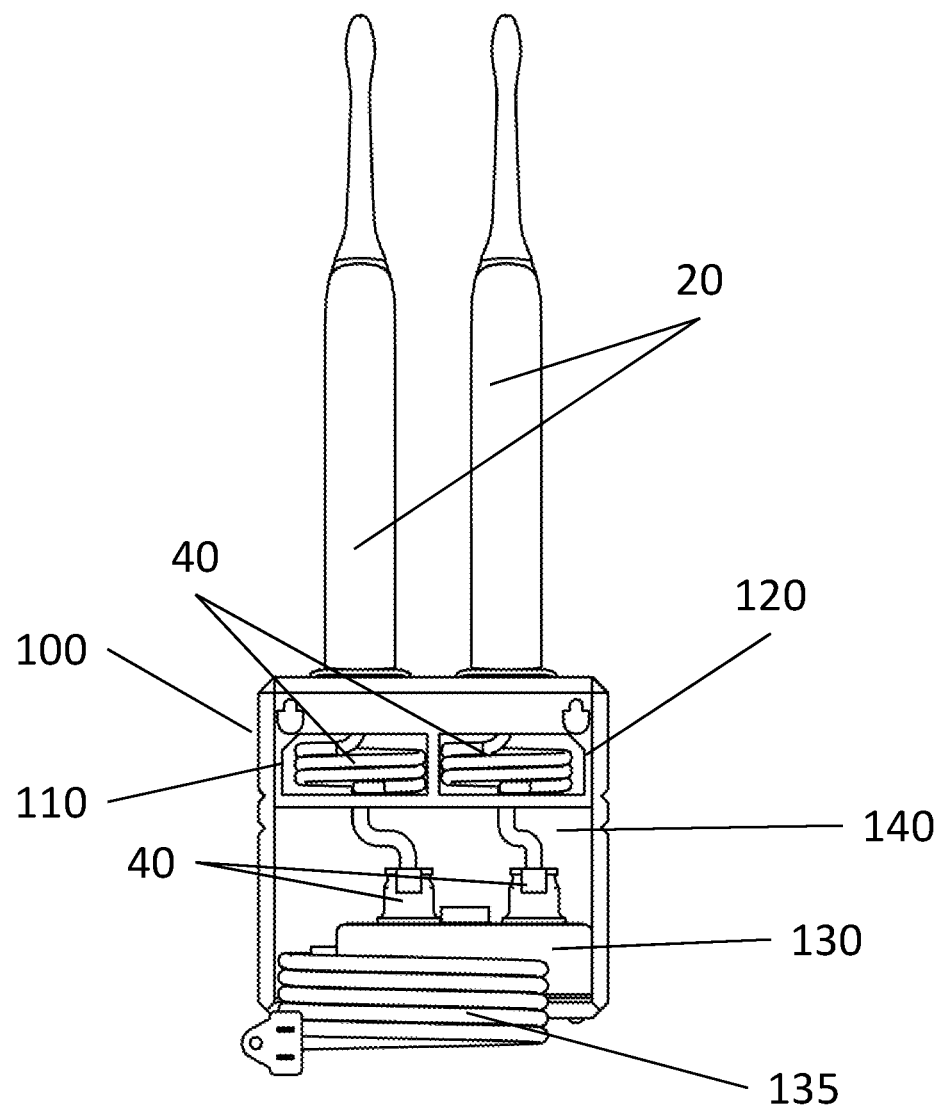
FIG. 7 shows a back view of the electric toothbrush charging station platform organizer of FIG. 5.

FIG. 7 shows a back view of the electric toothbrush charging station platform organizer of FIG. 5. As illustrated in FIG. 7, the electric toothbrush charging station platform organizer includes a housing 100 with power cord chambers 110 and 120 to secure power cords 40 of charging stations (not shown) of electric powered toothbrushes 20.

Moreover, the power cord chambers 110 and 120 may include vertical projections (not shown) located on a floor of the power cord chambers. The vertical projections (not shown) can be positioned to enable a power cord to be securely wrapped around at least two vertical projections.

The housing 100 of the electric toothbrush charging station platform organizer also includes a power strip chamber 140 for holding a power strip 130. The power strip 130 is secured horizontally in the power strip chamber 140 by a horizontal stop member (not shown).

The power strip 130 includes a power cord 135 for engaging a receptacle of an electrical outlet (not shown). The power strip 130 includes multiple electrical receptacles to receive the plugs of the power cords 40 of charging stations 30 of electric powered toothbrushes 20.

It is noted that the power strip 130 may be integral to the housing 100 of the electric toothbrush charging station platform organizer such that the power strip 130 is not a stand-alone removable element of the electric toothbrush charging station platform organizer. More specifically, the electronics and/or power receptacles of the power strip 130 may be integral to the housing 100 of the electric toothbrush charging station platform organizer. In this embodiment, the housing interface of the power cord 135 for the power strip 130 would also be integral to the housing 100 of the electric toothbrush charging station platform organizer.

As further illustrated in FIG. 7, the power cords 40, associated with charging stations (not shown), passes from recesses (not shown), through recess passages (not shown), into power cord chambers 110 and 120, and through power cord chamber passages (not shown). After passing through power cord chamber passages (not shown), the power cords 40 are located in power strip chamber 140 and can engage the power strip 130.

Figure 8:
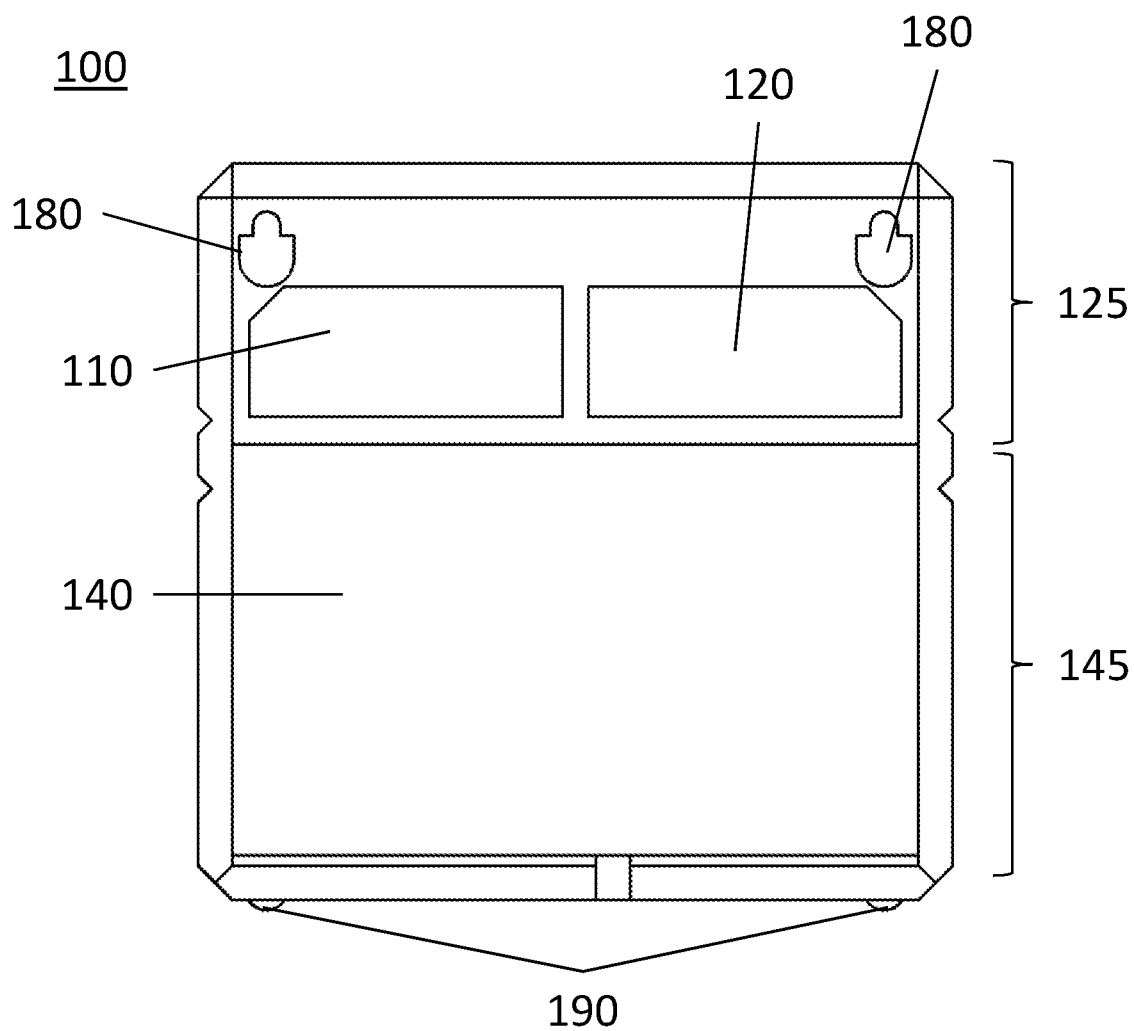
FIG. 8 shows a back view of the housing of electric toothbrush charging station platform organizer of FIG. 5.

FIG. 8 shows a back view of a housing of the electric toothbrush charging station platform organizer of FIG. 5. As illustrated in FIG. 8, the electric toothbrush charging station platform organizer includes a housing 100 with power cord chambers 110 and 120 to secure power cords (not shown) of charging stations (not shown) of electric powered toothbrushes (not shown).

Moreover, the power cord chambers 110 and 120 may include vertical projections (not shown) located on a floor of the power cord chambers. The vertical projections (not shown) can be positioned to enable a power cord to be securely wrapped around at least two vertical projections.

The housing 100 of the electric toothbrush charging station platform organizer also includes a power strip chamber 140 for holding a power strip (not shown) and projections (feet) 190 to prevent the electric toothbrush charging station platform organizer 100 from sliding across the top surface of a vanity.

As illustrated in FIG. 8, the housing 100 of the electric toothbrush charging station platform organizer can be divided into an upper portion 125 and a lower portion 145.

Figure 9:
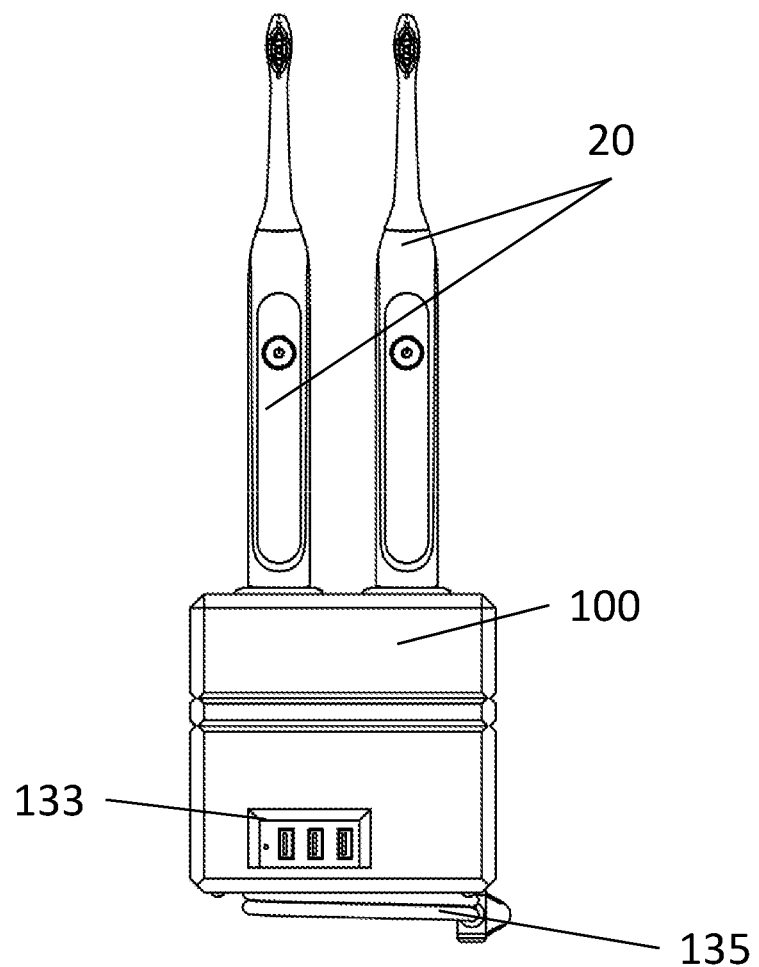
FIG. 9 shows a front view of the electric toothbrush charging station platform organizer of FIG. 5.

FIG. 9 shows a front view of the electric toothbrush charging station platform organizer of FIG. 5. As illustrated in FIG. 9, the electric toothbrush charging station platform organizer 100 includes USB power receptacles 133 for providing power to a USB cable (not shown). The USB power receptacles 133 are electrically connected to the power strip (not shown).

The electric toothbrush charging station platform organizer 100 also includes a power strip chamber 140 for holding a power strip (not shown) and projections (feet) 190 to prevent the electric toothbrush charging station platform organizer 100 from sliding across the top surface of a vanity.

Figure 10:
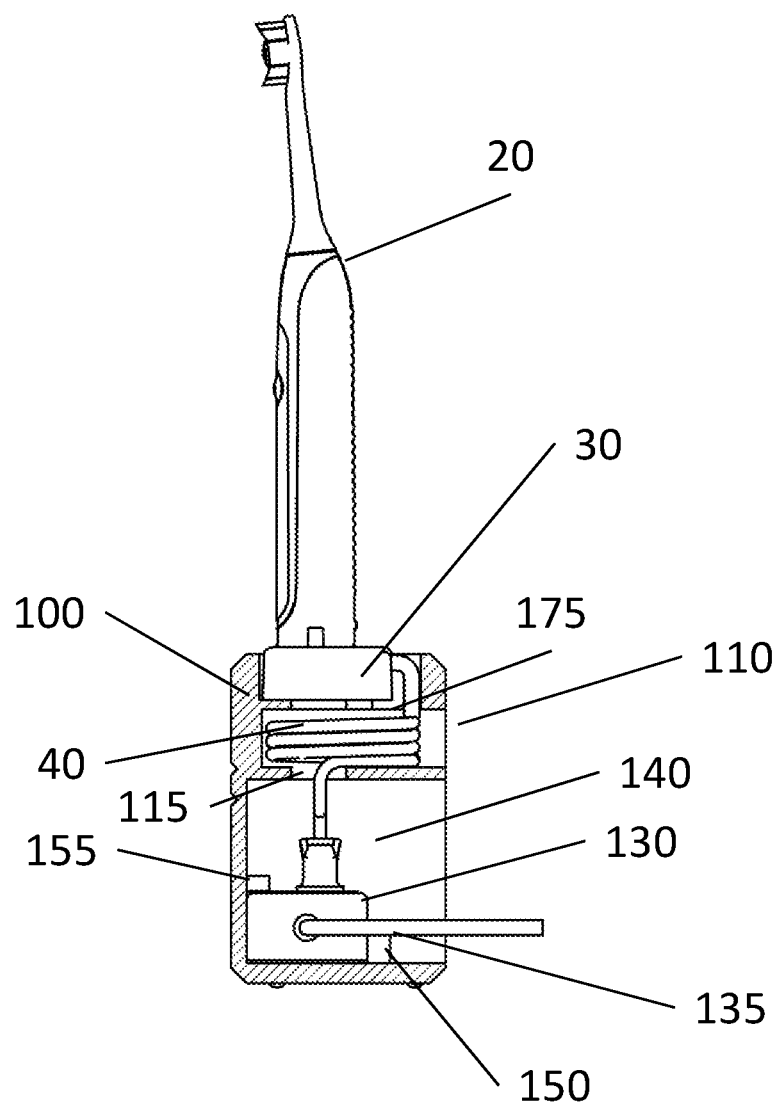
FIG. 10 shows a cutaway view of the electric toothbrush charging station platform organizer of FIG. 5.

FIG. 10 shows a cutaway view of the electric toothbrush charging station platform organizer of FIG. 5. As illustrated in FIG. 10, the electric toothbrush charging station platform organizer includes a housing 100 with power cord chamber 110 to secure power cord 40 of charging station 30 of electric powered toothbrush 20.

Moreover, the power cord chamber 110 may include vertical projections (not shown) located on a floor of the power cord chamber. The vertical projections (not shown) can be positioned to enable a power cord to be securely wrapped around at least two vertical projections.

The housing 100 of the electric toothbrush charging station platform organizer also includes a power strip chamber 140 for holding a power strip 130. The power strip 130 is secured horizontally in the power strip chamber 140 by a horizontal stop member 150. The power strip 130 is secured vertically in the power strip chamber 140 by a vertical stop member 155.

The power strip 130 includes a power cord 135 for engaging a receptacle of an electrical outlet (not shown). The power strip 130 includes multiple electrical receptacles to receive the plugs of the power cords 40 of charging stations 30 of electric powered toothbrushes 20.

It is noted that the power strip 130 may be integral to the housing 100 of the electric toothbrush charging station platform organizer such that the power strip 130 is not a stand-alone removable element of the electric toothbrush charging station platform organizer. More specifically, the electronics and/or power receptacles of the power strip 130 may be integral to the housing 100 of the electric toothbrush charging station platform organizer. In this embodiment, the housing interface of the power cord 135 for the power strip 130 would also be integral to the housing 100 of the electric toothbrush charging station platform organizer.

As further illustrated in FIG. 10, the power cord 40, associated with charging station 30, passes from recess (not shown), through recess passages 175, into power cord chamber 110, and through power cord chamber passage 115. After passing through power cord chamber passage 115, the power cord 40 is located in power strip chamber 140 and can engage the power strip 130.

Figure 11:
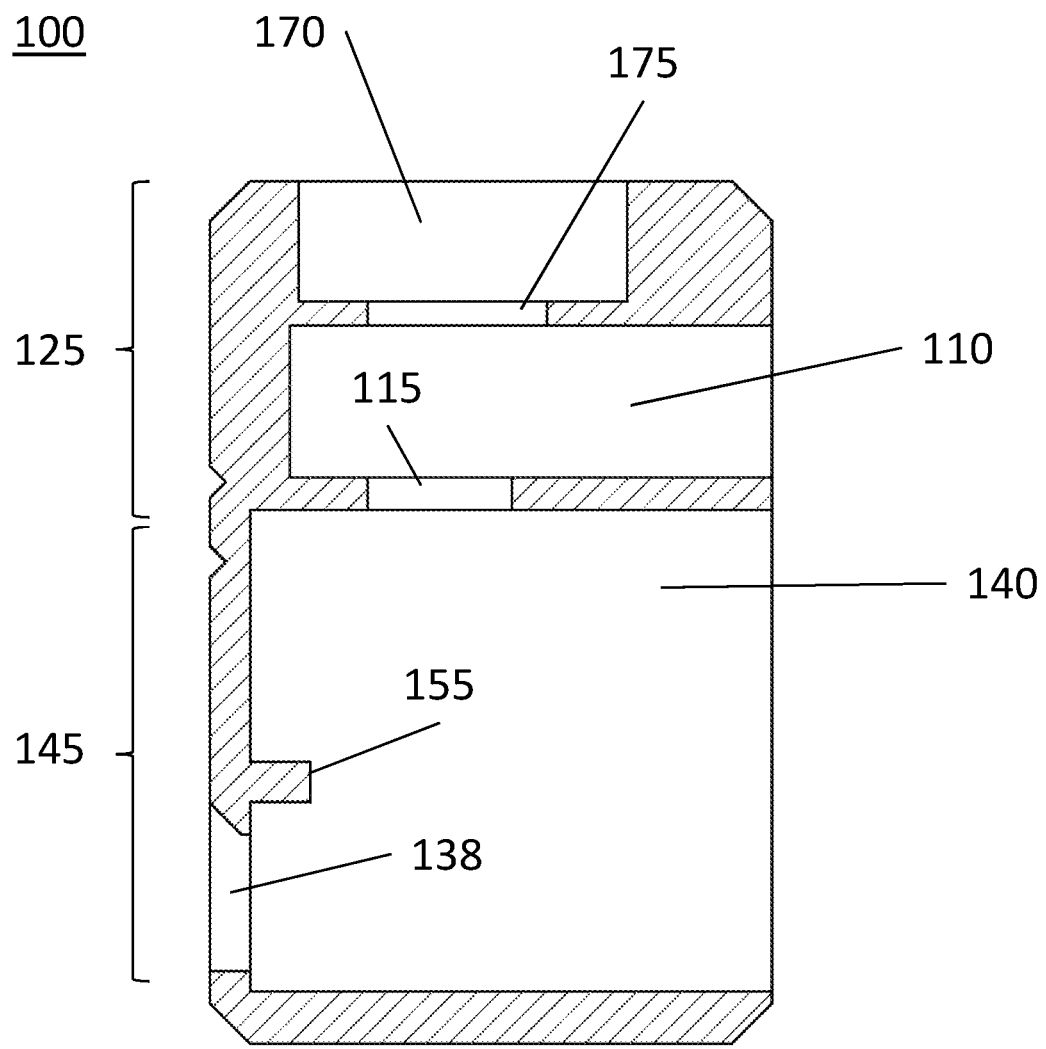
FIG. 11 shows a cutaway view of the housing of the electric toothbrush charging station platform organizer of FIG. 5.

FIG. 11 shows a cutaway view of a housing of the electric toothbrush charging station platform organizer of FIG. 5. As illustrated in FIG. 11, the electric toothbrush charging station platform organizer includes a housing 100 with power cord chamber 110 to secure a power cord (not shown) of charging station (not shown) of electric powered toothbrush (not shown).

Moreover, the power cord chamber 110 may include vertical projections (not shown) located on a floor of the power cord chamber. The vertical projections (not shown) can be positioned to enable a power cord to be securely wrapped around at least two vertical projections.

The housing 100 of the electric toothbrush charging station platform organizer further includes recess 170, which may be configured to match the shape of the charging stations (not shown). However, recess 170 is configured to securely retain the charging stations (not shown). The recess 170 may include a clip, a strap, or adhesive (such as double-sided tape), to securely retain the charging station (not shown). Recess 170 includes recess passage 175.

The housing 100 of the electric toothbrush charging station platform organizer also includes a power strip chamber 140 for holding a power strip (not shown). The power strip (not shown) is secured vertically in the power strip chamber 140 by a vertical stop member 155.

The housing 100 of the electric toothbrush charging station platform organizer further includes power cord chamber passage 115, which connects the volume of recess 170 to the volume of power strip chamber 140.

As further illustrated in FIG. 11, a power cord (not shown), associated with charging station (not shown), passes from recess 170, through recess passage 175, into power cord chamber 110, and through power cord chamber passage 115. After passing through power cord chamber passage 115, the power cord (not shown) is located in power strip chamber 140 and can engage the power strip (not shown).

The housing 100 of the electric toothbrush charging station platform organizer includes USB recess 138 to provide access to the USB power receptacles (not shown).

As illustrated in FIG. 11, the housing 100 of the electric toothbrush charging station platform organizer can be divided into an upper portion 125 and a lower portion 145. The recess 170, the recess passage 175, power cord chamber 110, and power cord chamber passage 115 are located in the upper portion 125. The lower portion 145 includes the power strip chamber 140, the vertical stop member 155, and USB recess 138.

Figure 12:
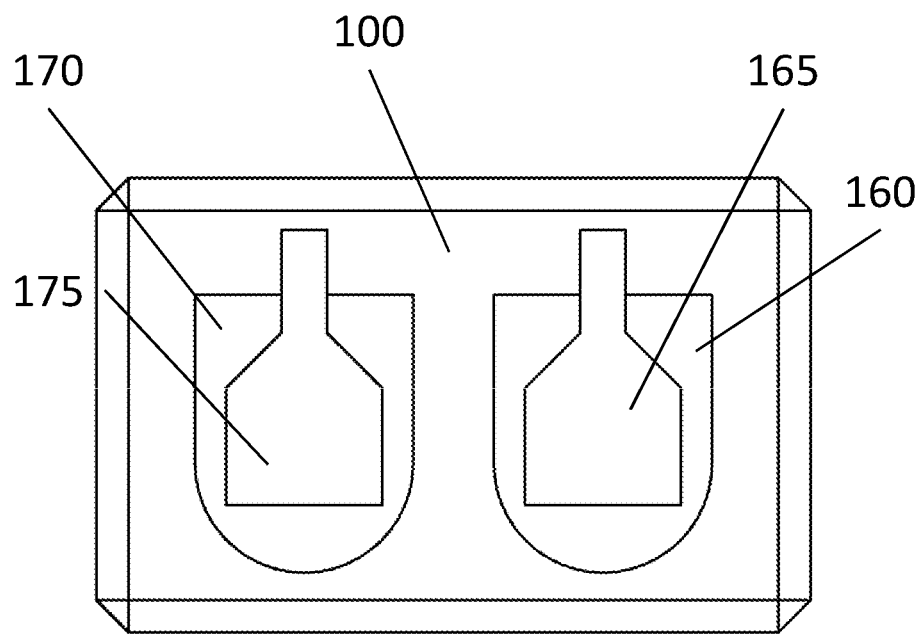
FIG. 12 is a top view of the housing of the electric toothbrush charging station platform organizer of FIG. 5.

FIG. 12 is a top view of the electric toothbrush charging station platform organizer of FIG. 5. As illustrated in FIG. 12, the electric toothbrush charging station platform organizer includes a housing 100 with recesses 170 and 160, which may be configured to match the shape of the charging stations (not shown).

However, recesses 170 and 160 are configured to securely retain the charging stations (not shown). The recess 170 may include a clip, a strap, or adhesive (such as double-sided tape), to securely retain the charging station (not shown). Recess 170 includes recess passage 175, and recess 160 includes recess passage 165.

It is noted that although the various embodiments described above include two power cord chambers for securing power cords, the power cord chambers can be combined into a single power cord chamber large enough to secure multiple power cords.

Moreover, the power cord chamber(s) may include vertical projections located on a floor of the power cord chamber. The vertical projections can be positioned to enable a power cord to be securely wrapped around at least two projections.

An electric toothbrush charging station platform organizer for an electric powered toothbrush system having an electric powered toothbrush and a charging station, comprising a housing; the housing including an upper portion and a lower portion; the upper portion of the housing including a recess configured to securely retain the charging station, a power cord chamber to secure a power cord of the charging station of an electric powered toothbrush, a recess passage connecting a volume of the recess with a volume of the power cord chamber, and a power cord chamber passage; the lower portion including a power strip chamber for locating a power strip; the power cord chamber passage connecting a volume of the power strip chamber with the volume of the power cord chamber.

The power strip chamber may include a horizontal stop member to horizontally retain a power strip.

The power strip chamber may include a vertical stop member to vertically retain a power strip.

The housing may include openings to enable mounting of the housing of the electric toothbrush charging station platform organizer to a wall.

The housing may be integral. The housing may be constructed of plastic.

The housing may include projections configured to prevent the electric toothbrush charging station platform organizer from sliding.

The electric toothbrush charging station platform organizer may include a power strip located in the power strip chamber.

The electric toothbrush charging station platform organizer may include USB receptacles configured to provide power to a USB cable.

The recess may be configured to match a shape of the charging station.

The power cord chamber may include vertical projections configured for a power cord to wrap therearound.

An electric toothbrush charging station platform organizer for an electric powered toothbrush system having an electric powered toothbrush and a charging station, comprising a housing; the housing including an upper portion and a lower portion; the upper portion of the housing including a first recess configured to securely retain the first charging station, a second recess configured to securely retain the second charging station, a first power cord chamber to secure a power cord of the first charging station of a first electric powered toothbrush, a second power cord chamber to secure a power cord of the second charging station of a second electric powered toothbrush, a first recess passage connecting a volume of the first recess with a volume of the first power cord chamber, a second recess passage connecting a volume of the second recess with a volume of the second power cord chamber, a first power cord chamber passage, and a second power cord chamber passage; the lower portion including a power strip chamber for locating a power strip; the first power cord chamber passage connecting a volume of the power strip chamber with the volume of the first power cord chamber; the second power cord chamber passage connecting a volume of the power strip chamber with the volume of the second power cord chamber.

The power strip chamber may include a horizontal stop member to horizontally retain a power strip.

The power strip chamber may include a vertical stop member to vertically retain a power strip.

The housing may include openings to enable mounting of the housing of the electric toothbrush charging station platform organizer to a wall.

The housing may be integral.

The housing may include projections configured to prevent the electric toothbrush charging station platform organizer from sliding.

The electric toothbrush charging station platform organizer may include a power strip located in the power strip chamber.

The electric toothbrush charging station platform organizer may include USB receptacles configured to provide power to a USB cable.

The housing may be constructed of plastic.

The first recess may be configured to match a shape of the first charging station. The second recess may be configured to match a shape of the second charging station.

The power cord chamber may include vertical projections configured for a power cord to wrap therearound.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. An electric toothbrush charging station platform organizer for an electric powered toothbrush system having an electric powered toothbrush and an electric powered toothbrush charging station, comprising:
an integral housing;
said integral housing including an upper portion and a lower portion;
said upper portion of said integral housing including,
a recess having a recess volume and configured to securely retain the electric powered toothbrush charging station,
a power cord chamber having a power cord chamber volume and configured to secure a power cord of the electric powered toothbrush charging station,
a recess passage connecting said recess volume of said recess with said power cord chamber volume of said power cord chamber, and
a power cord chamber passage;
said lower portion including a power strip chamber having a power strip chamber volume;
said power cord chamber passage connecting said power strip chamber volume of said power strip chamber with said power cord chamber volume of said power cord chamber.

2. The electric toothbrush charging station platform organizer, as claimed in claim 1, wherein said power strip chamber includes a horizontal stop member configured to horizontally retain a power strip.

3. The electric toothbrush charging station platform organizer, as claimed in claim 1, wherein said power strip chamber includes a vertical stop member configured to vertically retain a power strip.

4. The electric toothbrush charging station platform organizer, as claimed in claim 1, wherein said integral housing includes openings configured to enable mounting of the integral housing to a wall.

5. The electric toothbrush charging station platform organizer, as claimed in claim 1, wherein said power cord chamber is configured to have a power cord chamber opening configured to receive said power cord of the electric powered toothbrush charging station therein.

6. The electric toothbrush charging station platform organizer, as claimed in claim 1, wherein said integral housing includes projections configured to prevent said integral housing from sliding.

7. The electric toothbrush charging station platform organizer, as claimed in claim 1, further comprising a power strip.

8. The electric toothbrush charging station platform organizer, as claimed in claim 1, wherein said integral housing includes USB receptacles configured to provide power to a USB cable.

9. The electric toothbrush charging station platform organizer, as claimed in claim 1, wherein said recess is configured to match a shape of the electric powered toothbrush charging station.

10. The electric toothbrush charging station platform organizer, as claimed in claim 1, wherein said power cord chamber includes vertical projections configured for the power cord to wrap therearound.

11. An electric toothbrush charging station platform organizer for an electric powered toothbrush system, comprising:
an integral housing;
said integral housing including an upper portion and a lower portion;
said upper portion of said integral housing including,
a first recess having a first recess volume and configured to securely retain a first electric powered toothbrush charging station,
a second recess having a second recess volume and configured to securely retain a second electric powered toothbrush charging station,
a first power cord chamber having a first power cord chamber volume and configured to secure a first power cord of the first electric powered toothbrush charging station,
a second power cord chamber having a second power cord chamber volume and configured to secure a second power cord of the second electric powered toothbrush charging station,
a first recess passage connecting said first recess volume of said first recess with said first power cord chamber volume of said first power cord chamber,
a second recess passage connecting said second recess volume of said second recess with said second power cord chamber volume of said second power cord chamber,
a first power cord chamber passage, and
a second power cord chamber passage;
said lower portion including a power strip chamber having a power strip chamber volume;
said first power cord chamber passage connecting said power strip chamber volume of said power strip chamber with said first power cord chamber volume of said first power cord chamber;
said second power cord chamber passage connecting a said power strip chamber volume of said power strip chamber with said second power cord chamber volume of said second power cord chamber.

12. The electric toothbrush charging station platform organizer, as claimed in claim 11, wherein said power strip chamber includes a horizontal stop member configured to horizontally retain a power strip.

13. The electric toothbrush charging station platform organizer, as claimed in claim 11, wherein said power strip chamber includes a vertical stop member configured to vertically retain a power strip.

14. The electric toothbrush charging station platform organizer, as claimed in claim 11, wherein said integral housing includes openings configured to enable mounting of the integral housing to a wall.

15. The electric toothbrush charging station platform organizer, as claimed in claim 11, wherein said power cord chamber is configured to have a power cord chamber opening configured to receive said power cord of the electric powered toothbrush charging station therein.

16. The electric toothbrush charging station platform organizer, as claimed in claim 11, wherein said integral housing includes projections configured to prevent said integral housing from sliding.

17. The electric toothbrush charging station platform organizer, as claimed in claim 11, further comprising a power strip.

18. The electric toothbrush charging station platform organizer, as claimed in claim 11, wherein said integral housing includes USB receptacles configured to provide power to a USB cable.

19. The electric toothbrush charging station platform organizer, as claimed in claim 11, wherein said first recess is configured to match a shape of the first electric powered toothbrush charging station;
said second recess is configured to match a shape of the second electric powered toothbrush charging station.

20. The electric toothbrush charging station platform organizer, as claimed in claim 11, wherein said first power cord chamber includes vertical projections configured for the first power cord to wrap therearound;

said second power cord chamber includes vertical projections configured for the second power cord to wrap therearound.

21. An electric toothbrush charging station platform organizer for an electric powered toothbrush system having an electric powered toothbrush and an electric powered toothbrush charging station, comprising:

an integral housing;

said integral housing including,
- a recess having a recess volume and configured to securely retain the electric powered toothbrush charging station,
- a power cord chamber having a power cord chamber volume and configured to engage a power cord of the electric powered toothbrush charging station,
- a recess passage connecting a said recess volume of said recess with a said power cord chamber volume of said power cord chamber,
- a power cord chamber passage, and
- a power strip chamber having a power strip chamber volume;
- a power strip chamber passage connected to said power strip chamber volume;

said power cord chamber passage being configured to enable the power cord of the electric powered toothbrush charging station enter said power strip chamber;

said power strip chamber being configured to enable the power cord of the electric powered toothbrush charging station to exit said integral housing.

22. The electric toothbrush charging station platform organizer, as claimed in claim 21, wherein said power strip chamber includes a horizontal stop member configured to horizontally retain a power strip.

23. The electric toothbrush charging station platform organizer, as claimed in claim 21, wherein said power strip chamber includes a vertical stop member configured to vertically retain a power strip.

24. The electric toothbrush charging station platform organizer, as claimed in claim 21, further comprising a power strip;

said power strip chamber power strip being configured to engage said power strip.

25. The electric toothbrush charging station platform organizer, as claimed in claim 21, wherein said recess is configured to match a shape of the electric powered toothbrush charging station.

* * * * *